Figure 4A:
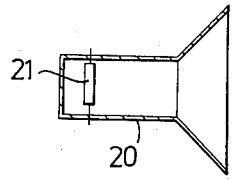

United States Patent [19]

Henoch et al.

[11] 4,295,221
[45] Oct. 13, 1981

[54] METHOD AND APPARATUS AT ONE-WAY OR TWO-WAY INFORMATION LINK TO EFFECT INTERFERENCE SUPPRESSION

[75] Inventors: Bengt Henoch, Hägersten; Eilert Berglind, Bandhagen, both of Sweden

[73] Assignee: Stiftelsen Institute for Mikrovagsteknik vid Tekniska Hogskolan i Stockholm, Stockholm, Sweden

[21] Appl. No.: 897,374

[22] Filed: Apr. 18, 1978

[30] Foreign Application Priority Data

Apr. 28, 1977 [SE] Sweden .................. 7704935

[51] Int. Cl.³ .................. H03K 5/08; H03K 7/06
[52] U.S. Cl. .................. 375/23; 375/99
[58] Field of Search .................. 325/42, 65; 340/177 R, 340/206, 203; 179/15 BA, 15 BL; 375/23, 80, 94, 99; 307/231, 233 R, 234; 332/16 R

[56] References Cited

U.S. PATENT DOCUMENTS

| | | | |
|---|---|---|---|
| 2,381,847 | 8/1945 | Ullrich | 179/15 BA |
| 2,425,066 | 8/1947 | Labin | 179/15 BA |
| 3,261,919 | 7/1966 | Aaron | 179/15 BA |
| 3,261,920 | 7/1966 | Aaron | 179/15 BA |
| 4,027,276 | 5/1977 | Shaughnessy | 375/23 |
| 4,032,848 | 6/1977 | Shaughnessy | 455/53 |
| 4,095,211 | 6/1978 | Shaughnessy | 375/23 |

Primary Examiner—Jin F. Ng
Assistant Examiner—Michael A. Masinick
Attorney, Agent, or Firm—LeBlanc, Nolan, Shur & Nies

[57] ABSTRACT

A radio communication method and apparatus for transmitting a modulated radio frequency signal from a first station to a second station wherein an information-bearing pulse train for modulating the radio frequency signal is chopped at a constant pre-selected rate, wherein a receiver at the second station receives the modulated radio frequency signal and has a detector for detecting the received radio frequency signal to provide an intelligence signal component containing the information and having a frequency corresponding to the pre-selected chopping rate, a bandpass filter tuned to the pre-selected chopping frequency for passing the above mentioned intelligence signal component while rejecting other signal components of different frequencies, circuitry for processing the intelligence signal component passed by the bandpass filter, and a circuit connected intermediate the detector and the bandpass filter for passing to the bandpass filter just those pulse signal components having a pulse width corresponding to the width of pulses in the chopped-up pulse train and a maximum amplitude exceeding a pre-selected threshold level.

9 Claims, 10 Drawing Figures

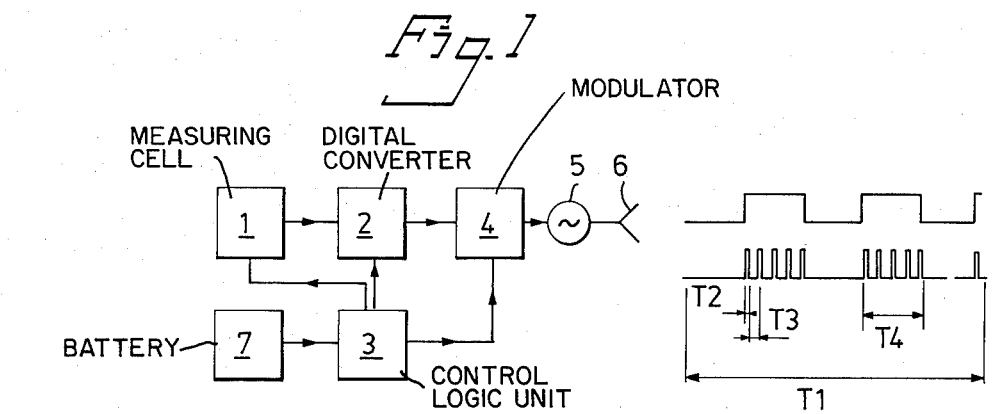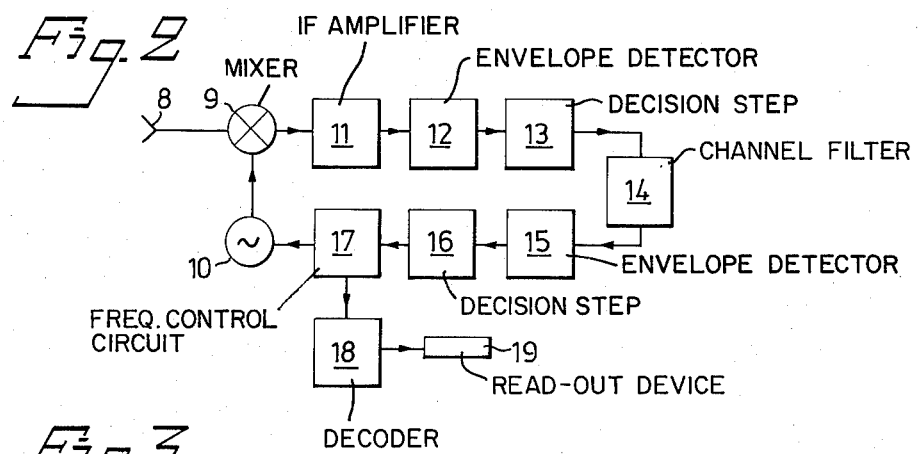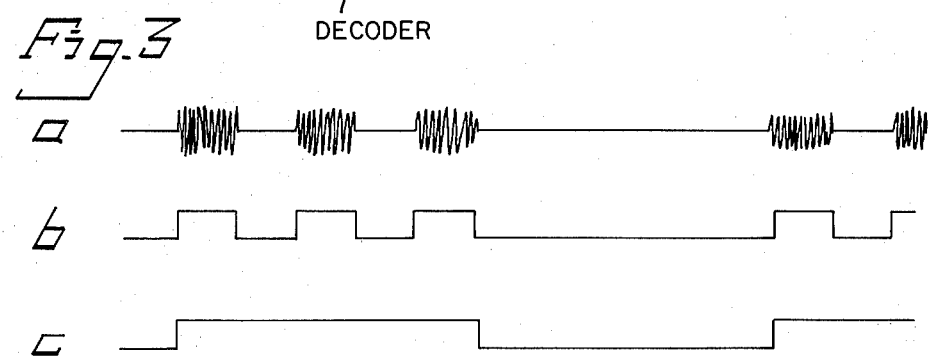

METHOD AND APPARATUS AT ONE-WAY OR TWO-WAY INFORMATION LINK TO EFFECT INTERFERENCE SUPPRESSION

This invention relates to a method and an apparatus for effecting the supression of interferences in a one-way or two-way information link, particularly interferences in the presence of two or more information links.

Where two or more information links occur simultaneously it is a known practice to transmit information on substantially different frequencies for different information links. Due to problems of frequency assignment, however, it often is desirable to transmit information in several information links simultaneously with substantially the same frequency. Interferences thereby arise due, for example, to reflections, so that the information received is not fully reliable. Conventional apparatuses, moreover, generally are complicated and have a relatively high energy consumption.

The present invention provides a simple method and a simple apparatus for transmitting information in an information link where intereferences are suppressed in such a manner, that a high reliability in the signal transmission is obtained. The method and the apparatus according to the invention further render possible an extremely low energy consumption, compared with known apparatuses, in oen of the two units included in an information link.

The present invention thus relates to a method and apparatus for a one-way or two-way information link consisting of two units wherein the first unit at least is capable of emitting a signal and the second unit at least is capable of receiving the emitted signal, to effect suppression of interferences in the presence of two or more information links, which interferences primarily consist of signals transmitted between said lastmentioned information links. The invention is characterized in that a signal to be transmitted from said first unit to said second unit is formed to a first pulse train, the pulses of which are chopped up into a plurality of pulses having a certain pulse repetition frequency individual to each information link, which second pulse train thus obtained preferably is modulated on a carrier wave of substantially higher frequency, and the signal thus emitted is received in said second unit and passed to means comprising a channel filter, which permits passage only of a received signal containing said pulse repetition frequency.

Figure 4B:
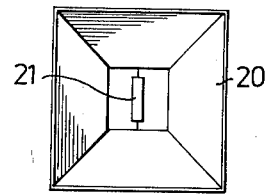
Figure 5A:
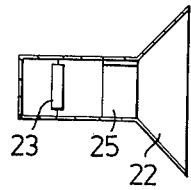
Figure 5B:
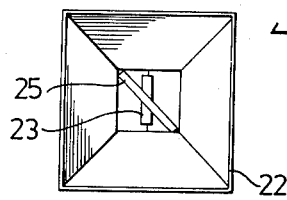
Figure 6:
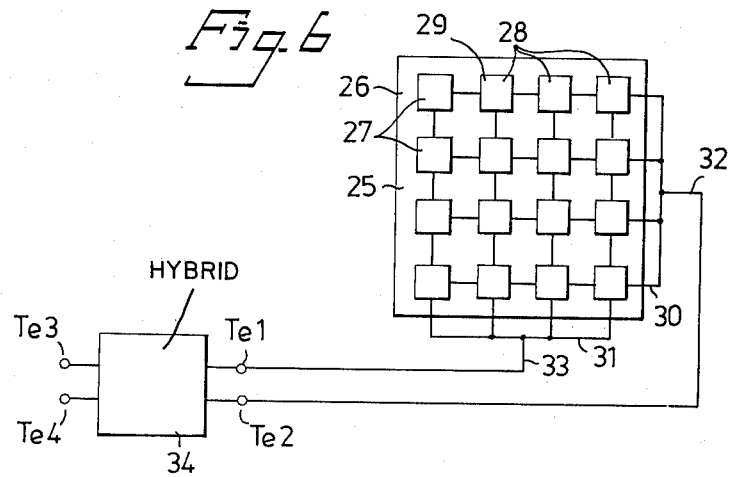

The invention is described in greater detail in the following, with reference to the accompanying drawings, in which:

FIG. 1 is a block diagram of a first unit according to the invention and two pulse trains, FIG. 2 is a block diagram of a second unit according to the invention, FIGS. 3a–3c show a signal in different stages in said second unit, FIGS. 4a–4b show a horn aerial by way of a lateral view and a front view according to one embodiment, FIGS. 5a–5b show a horn aerial by way of a lateral view and a front view according to a second embodiment, FIG. 6 shows an aerial with a device associated with the aerial.

In FIG. 1 a recording and transmitting apparatus according to the invention is shown, which hereinafter is called recording transmitter, and which comprises a measuring cell 1, and analog/digital converter 2, a control logic unit 3, a modulator 4, an oscillator 5, an aerial 6 and a battery 7.

The measuring cell 1 is capable of supplying an analog signal representing the value or the state, on which information is desired, for example weight, volume, flow, pressure etc. The analog signal is emitted from the measuring cell 1 to the analog/digital converter 2, which digitizes the analog signal. The digitized signal is transmitted to the modulator 4 where the signal consisting of one pulse train is chopped up into an additional number of pulses, as indicated to the right in FIG. 1.

The analog signal from the measuring cell 1 has a duration of about 10 ms. After having passed the analog/digital converter 2, the signal, which is of on-off nature, consists of a number of pulses, where the total length (T1) of the signal is about 100–200 ms. The analog/digital converter 2 preferably comprises a recording unit of such a nature, that it stores the analog signal from the measuring cell 1 for digitizing after the preceding signal has been digitized. Each pulse having a length T4 of about 10 ms, and this signal is chopped up in the modulator 4 into a number of pulses with a length (T2) of, for example, 1 $\mu$s and with a pulse repetition frequency of 1–2 kHz. The distance (T3) between each pulse, thus, is 0.5–1 ms, see FIG. 1. The modulator 4 controls the oscillator 5 in such a manner, that a pulse train comprising said lastmentioned pulses is emitted via the aerial 6.

The control logic unit 3 controls the changes of the measuring cell 1 between active and passive state. The control logic unit 3 preferably emits impulses to the measuring cell 1, so that it measures three times per second for a period of about 10 ms each time.

The digitized signal, further, is coded in the modulator 4. The coding comprises in known manner the conversion of the content of the digitized signal according to a code pattern, which preferably is stored in the control logic unit 3. The control logic unit also controls the change of the analog/digital converter 2 between active and passive state synchronously with corresponding changes of the measuring cell 1. The signal emitted from the aerial 6 consists, as mentioned, of a pulse train where each pulse in its turn consists, in the manner described above, of a number of pulses with the pulse repetition frequency 1–2 kHz. The frequency of the oscillator 5 is about 10 GHz.

The signal thus emitted is intended to be received in a receiving and recording unit, hereinafter called recording unit, shown in FIG. 2. The recording unit comprises an aerial 8, a mixer 9, a local oscillator 10, an intermediate frequency amplifier 11, a first envelope detector 12, a first decision step 13, a channel filter 14, a second envelope detector 15, a second desision step 16 and a frequency control circuit 17. The recording unit further comprises a decoder 18 and a device 19 for writing, illustrating or further transporting the decoded information.

The signal emitted by the recording transmitter with a frequency of about 10 GHz is received by the aerial 8 of the recording unit and passed to the mixer 9. The mixer 9 is supplied with a signal of a frequency of about 30 MHz above or below 10 GHz from the local oscillator 10, so that the signal received is mixed down to about 30 MHz. This receiver unit, thus, is a superheterodyne. The mixed-down signal is amplified in the intermediate frequency amplifier 11, whereafter the signal in principle has an appearance as shown in FIG. 3a. The signal hereafter passes the first envelope detector 12, after which a first decision step 13 follows. This decision step determines whether the pulses in the signal have such a height that they with great probability are pulses emitted by the recording transmitter rather than interference pulses received by the aerial 8. Provided that the pulses have a duration agreeing with pulses emitted from a recording transmitter, the decision step 13 gives the same height to the pulses, see FIG. 3b. The signal thereafter passes the channel filter 14, which substantially is a band-pass filter with a centre frequency equal to the pulse repetition frequency, in which filter signals, which do not consist of pulse trains with a pulse repetition frequency given by the recording transmitter, i.e. 1–2 kHz in above examples, are filtered off. The channel filter 14 is followed by the second envelope detector 15, which converts all pulses with a mutual distance given by the pulse repetition frequency to one pulse by means of an integration method, so that again a pulse train consisting of pulses with a length of about 10 ms is obtained. The subsequent second decision step 16 determines whether the pulse length and the height obtained after the integration are such that the signal can be identified with the pulses, which are emitted by the recording transmitter, or whether the pulses are interferences. Provided that the pulses originate from the recording transmitter, the decision step 16 gives the same height to the pulses, see FIG. 3c, and feeds the pulses to a frequency control circuit 17 and to a decoder 18. The frequency control circuit 17 measures the signal strength of the signal from the second decision step and thereafter adjusts the local oscillator 10 by maximizing the signal strength of the signal from the second decision step, if the frequency differs from the intended mixing frequency, for example 30 MHz, so tht the intended mixing frequency is obtained.

The decoder 18 decodes the signal received and thereafter controls by known devices a panel 19, a writing device etc. or a further transport of the information thus obtained about weight, pressure etc., which the measuring cell has measured, for example to data collecting system.

In order to prevent interferences received by the recording unit from being regarded as signals from the recording transmitter and thereby after having passed the decoder 18 give rise to an incorrect information, each signal emitted after a measurement can be provided during the coding in the recording transmitter with an opening code in the form of a unique pulse train. This opening code is analysed after its receiving by the recording unit in the decoder 18 thereof. When the code is in agreement with a code key stored in the decoder, the decoder is opened and decodes the signal and passes on the measuring value thereby obtained.

The afore-described embodiment of the invention is a one-way information link. The recording unit, however, can be equipped with a transmitter and a suitable aerial, and the recording transmitter be equipped with a receiver and a suitable aerial, in order in this way to render possible two-way information flow. The signals emitted from the recording unit then are intended, for example, to start measurements of the recording transmitter by the measuring cell and transmission of the measuring result, or for other control of the recording transmitter, for example battery control, as described above.

The apparatus according to the invention preferably is designed so that the rotation ratio of the recording transmitter and recording unit relative to each other does not affect the information transmission. One example of an application field where this is required is, when the recording transmitter is attached stationary to a crane hook for measuring the weight of a load suspended on the crane hook, and the recording unit is attached stationary to the jib, which via wires supports the crane hook.

The apparatus according to the invention, for the aforesaid purpose, is designed so that the information transmission is rotation responsive, as will be described in greater detail in the following. According to a first embodiment, the aerial 6 of the recording transmitter is a waveguide horn 20, in which a transmitter element 21 consisting of a diode is located, so that a plane polarized wave is emitted, see FIGS. 4a, 4b. The recording unit is equipped with a waveguide horn aerial 22. In the rear portion of said waveguide horn 22 a receiver element 23 in the form of a diode is provided. In the forward portion of said horn there is further provided a plate 25 of dielectric material, which is positioned at an angle of 45° to the plane in which the receiver diode 23 is located.

The plane polarized wave emitted from the recording transmitter is thereby divided into two waves perpendicular to each other when the wave passes said plate 25. These waves give rise to a receiver signal in the diode 23, which is coupled in a suitable way to the input of the mixer 9. The wave after having passed the plate 25, thus, is divided into two waves perpendicular relative to each other, so that the rotation ratio of the two aerials relative to each other does not affect the information transmission.

According to a second embodiment, the recording transmitter is equipped with an aerial corresponding to that described above for the recording unit, whereby a circular polarized wave is emitted. The aerial of the recording unit corresponds to the aerial described above for the recording transmitter.

The aerials both of the recording transmitter and of the recording unit, of course, may instead be waveguide horns with a diode and a dielectric plate, so that the transmitter diode produces a plane polarized wave, which is converted to a circular polarized wave, which is received in the recording unit, whereby it is converted to a plane polarized wave, which is received by the receiver diode.

For two-way information exchange, the receiver of the recording unit preferably is a so-called superheterodyne receiver, as described above, and the receiver of the recording transmitter either is a so-called video receiver or a superheterodyne receiver.

Instead of a waveguide horn an aerial may be used, which has the form of a plane mat 26 of electrically non-conductive material, which is provided with electrically conductive elements 29 arranged in rows 27 and columns 28 and spaced from each other. Said elements 29 are electrically connected in rows and columns with electric conductors. All rows, furthermore, are interconnected along two sides perpendicular to each other, and all columns are interconnected by conductors 30 and, respectively, 31. Centrally on each such conductor 30,31 a tap 32,33 is located, which forms an input or output for a high-frequency signal emitted or received by the aerial. When a signal is applied only to one of the two inputs, a plane polarized wave is emitted with an orientation in parallel with the rows 27 when the tap 32 is used, and in parallel with the columns 28 when the tap 33 is used.

To said lastmentioned aerial a phase shifting circuit, preferably a so-called 3 dB hybride 34 is coupled in between the aerial and the transmitter element of the recording transmitter and, respectively, the receiver element of the recording unit. The hybride has four connection terminals Te1, Te2, Te3, Te4 and is of such a nature that, when a signal is fed in on the terminal Te3 the signal is divided into two signals with a 90° phase shifting relative to each other, of which signals one is discharged on the terminal Te1 and the other one is discharged on Te2, whereby the aerial 25, thus, emits a circular polarized wave. Invertedly, at receiving, when the aerial 35 receives a circular polarized wave, a first signal is fed in from the aerial on the terminal Te1, and a second signal, which is 90° phase shifted in relation to the first signal, is fed in on the terminal Te2. One of these signals is phase shifted in the hybride 24 so that the two signals are given the same phase, whereafter they are discharged on the terminal Te4, while the terminal Te3 is dead.

When one-way information flow is desired, thus, a transmitter diode is coupled in on the terminal Te3 in the recording transmitter, and a receiver diode is coupled in on the terminal Te4 in the recording unit.

Modifications of this aerial, however, can be used for one-way information transmission. According to a first modification, a transmitter diode is coupled in directly either to the conductor 32 or 33, whereby a plane polarized wave is emitted. The receiver in this case is such as described with reference to FIG. 6. According to a second modification, the transmitter is designed according to FIG. 6, whereby a circular polarized wave is emitted, and the receiver is designed so that a receiver diode is coupled in directly on one of the conductors 32 or 33. When diodes are coupled directly on the conductors 32 or 33, then there is no hybride.

When two-way information flow is intended, both a transmitter diode and a receiver diode are found both in the recording transmitter and in the recording unit.

Where there is two-way information flow according to the method and apparatus of the invention, the information from the recording unit to the recording transmitter consists, for example, of start and stop orders, questions concerning different measuring values if such are available, battery control concerning the abovementioned battery, etc.

The recording transmitter and recording unit are adjusted to each other, so that the pulse repetition frequency of the signal emitted by the recording transmitter agrees with the centre frequency in the channel filter 14 of the associated recording unit. This implies, that several pairs of recording transmitter and recording unit can be permitted to operate simultaneously near to each other, when the pulse repetition frequency and the centre frequency are chosen different for different pairs. A signal received in a recording unit from a recording transmitter associated with a different pair will be filtered off in the channel filter 14 of the recording unit. With the present invention, thus, a very good separation between different pairs of recording transmitter and recording unit is obtained.

According to the present invention, furthermore, interferences of different kind received by the aerial 8 of a recording unit are suppressed to a very great extent. Interferences are filtered off, as is apparent from above, in the first decision step 13 where only pulses of a certain height and duration are permitted to pass, and in the channel filter 14 where only a signal with a certain pulse repetition frequency is permitted to pass, and in the second decision step 16 where only pulses of a certain pulse length are permitted to pass. The probability that an interference, which has been received, will pass through the recording unit and thereby give rise to a measuring value etc., thus is very small.

As mentioned above, different pairs of recording transmitter and recording unit can be made independent of each other thereby, that the pulse repetition frequency and the center frequency are chosen different for each such pair. However, also the pulse length as well as said codings can be chosen individually for each pair.

The pulses of said digitized signals are chopped up, as mentioned into a number of pulses with a length of about 1 $\mu$s and with a distance of about 1 ms between each pulse. The oscillator 5 in the recording transmitter has on-off nature, and it therefore operates only about one thousandth of the time a signal is emitted, compared with if the pulses of the digitized signal were emitted in their entirety. The measuring cell 1, furthermore, is active only about 10 ms three times per second, so that it requires only about 1/30 of the energy, which it would require at a continuously active state. The aforesaid, thus, implies that the energy demand of the recording transmitter is substantially lower than that of a continuously operating recording transmitter. For many applications of an information link of the kind here referred to a long operation time without change of the voltage source is desirable, and, therefore, the substantially lower energy demand of an information link according to the present invention is a highly important advantage.

A further advantage of the apparatus according to the invention is that a large range is obtained by using a superheterodyne in the receiving unit, which can be supplied with energy from external energy sources and, thus, is not dependent on a battery for energy supply.

The invention must not be regarded restricted to the embodiments described above, but can be varied within the scope of the attached claims.

We claim:

1. A method providing communication between first and second stations comprising the steps of providing a first pulse train containing certain information at said first station, chopping the pulses in said first pulse train at a constant pre-selected chopping frequency at said first station to develop a second pulse train, modulating said second pulse train onto a carrier signal at said first station, said carrier signal having a frequency tht is substantially higher than said chopping frequency, and said chopping frequency being individual to the communication link between said first and second stations to distinguish said link from other communication links, transmitting the thusly modulated carrier signal from said first station, receiving the transmitted carrier signal along with interference signals, if present, at said second station to provide a received signal, detecting the received signal at said second station to provide a detected signal having an intelligence signal component which contains said information and which has a pulse frequency corresponding to said pre-selected chopping frequency, filtering the detected signal at said second station to separate the intelligence signal component from other signal components of different frequencies and to thereby provide for the recovery of said intelligence signal component, and processing the recovered intelligence signal component following filtering to retrieve said information.

2. The method defined in claim 1 including the step of acting on the detected signal at said second station before filtering to pass just those pulse signal components having (a) a pulse width corresponding to that of the pulses in said second train and (b) a maximum amplitude exceeding a pre-selected threshold level.

3. The method defined in any of the preceding claims 1 and 2 wherein the pulses in said first pulse train have a common pre-selected width, and wherein said intelligence signal component is processed to retrieve said information by passing to a decoder only those pulses of the detected, filtered signal which have a pulse width corresponding to the pulse width in said first pulse train.

4. A method providing communication between first and second stations comprising the steps of providing a pulse train containing certain information at said first station, chopping the pulses in said pulse train at a constant pre-selected chopping frequency at said first station to develop a pulse signal, providing for the transmission of said pulse signal from said first station, said chopping frequency being individual to the communication link between said first and second stations to distinguish said link from other communication links, receiving the transmitted pulse signal along with interference signals, if present, at said second station to provide a received signal, detecting the received signal at said second station, filtering the components resulting from the detection of the received signal at said second station to separate the pulse signal having said pre-selected chopping frequency from other signal components of different frequencies, and processing said pulse signal following filtering to retrieve said information.

5. A communication apparatus providing for the reception of a modulated radio frequency signal wherein the modulation on said radio signal is in the form of an intelligence-bearing pulse train containing certain information and having its pulses chopped at a constant, pre-selected rate to produce several individual pulses, said communication apparatus comprising means for detecting the received radio signal to provide a detected signal having an intelligence signal component which contains said information and which has a pulse frequency corresponding to said pre-selected rate, a bandpass filter tuned to a frequency corresponding to said pre-selected rate and electrically connected to filter the components of said detected signal for passing said intelligence signal component while rejecting signal components of frequencies differing from said pre-selected rate, and means connected to said filter for processing the intelligence signal component passed by said filter to provide for the retrieval of said information.

6. The communication apparatus defined in claim 5 comprising circuit means electrically connected intermediate said detecting means and filter and acting on the detected signal for feeding to said filter just those signal components having (a) a pulse width corresponding to that of said individual pulses in said pulse train and (b) a maximum amplitude exceeding a pre-selected threshold.

7. The communication apparatus defined in claim 6 wherein said means for processing said intelligence signal component includes a decoder, and a circuit electrically connected intermediate said decoder and said filter and having means acting on said intelligence signal component to provide an information-bearing pulse signal containing said information and corresponding to said intelligence pulse train before the latter is chopped, said circuit having further means for passing said information-bearing pulse train to said decoder and for rejecting passage of those pulse signal components having pulse widths which do not correspond to the width of pulses in said intelligence pulse train before the latter is chopped, and said decoder having means for decoding said information in said information-bearing pulse signal.

8. A radio communication system comprising transmitter apparatus located at a first station and including (a) first means providing a first pulse train containing certain information in the form of pulses having the same pre-selected width, (b) second means for chopping the pulses in said first train at a constant pre-selected rate to provide a second pulse train in which there are several individual pulses for each pulse in said first train, (c) means providing a radio frequency signal modulated with said second pulse train and (d) means for emitting the modulated radio frequency signal to provide for the transmission thereof to a second station, and receiver apparatus located at said second station for receiving the modulated radio frequency signal upon its transmission and including (a) means for detecting said modulated radio frequency signal upon its reception to provide a detected signal having an intelligence signal component which contains said information and which has a frequency corresponding to said pre-selected rate, (b) a bandpass filter tuned to a frequency corresponding to said preselected rate and connected to filter said detected signal for passing said intelligence signal component while rejecting signal components of frequencies differing from said pre-selected rate, and (c) means connected to said filter for processing the intelligence signal component passed by said filter to provide for the retrieval of said information.

9. The radio communication system defined in claim 8 wherein said receiver apparatus further includes means connected intermediate said detecting means and said filter and acting on said detected signal for feeding to said filter just those signal components having (a) a pulse width corresponding to that of said individual pulses and (b) a maximum amplitude exceeding a pre-selected threshold level.

* * * * *